United States Patent
Kim et al.

(10) Patent No.: US 9,632,178 B2
(45) Date of Patent: Apr. 25, 2017

(54) APPARATUS AND METHOD FOR REMOVING NOISE OF ULTRASONIC SYSTEM

(71) Applicant: Hyundai Motor Company, Seoul (KR)

(72) Inventors: Dong Won Kim, Seoul (KR); Jeong Hoon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 480 days.

(21) Appl. No.: 14/140,162

(22) Filed: Dec. 24, 2013

(65) Prior Publication Data

US 2015/0092518 A1    Apr. 2, 2015

(30) Foreign Application Priority Data

Sep. 27, 2013  (KR) .................. 10-2013-0115145

(51) Int. Cl.
*G01S 15/00* (2006.01)
*G01S 15/93* (2006.01)
*G01S 7/527* (2006.01)

(52) U.S. Cl.
CPC ............ *G01S 15/931* (2013.01); *G01S 7/527* (2013.01)

(58) Field of Classification Search
CPC .......... G01S 15/00; G01S 13/90; G01S 7/023; H04B 1/06
See application file for complete search history.

(56) References Cited

U.S. PATENT DOCUMENTS

| 5,657,021 A * | 8/1997 | Ehsani-Nategh ....... G01S 7/023 342/189 |
| 6,393,377 B1 * | 5/2002 | Shirai .................... G01S 7/487 342/118 |
| 2003/0151541 A1 | 8/2003 | Oswald et al. |
| 2006/0126434 A1 * | 6/2006 | Intrator ............... G01S 7/52004 367/135 |
| 2009/0103595 A1 * | 4/2009 | Watanabe .............. G01S 7/526 375/219 |
| 2011/0169686 A1 * | 7/2011 | Eusebi Borzelli ...... G01S 13/90 342/25 A |

(Continued)

FOREIGN PATENT DOCUMENTS

| JP | 07-280542 A | 10/1995 |
| JP | 2002-186615 A | 7/2002 |

(Continued)

*Primary Examiner* — Luke Ratcliffe
*Assistant Examiner* — Hovannes Baghdasaryan
(74) *Attorney, Agent, or Firm* — Mintz Levin Cohn Ferris Glovsky and Popeo, P.C.; Peter F. Corless

(57) ABSTRACT

An apparatus and method for removing noise of an ultrasonic system to improve robustness against noise by removing external noise from a reception signal reflected from an object are provided. The method includes transmitting, by a sensor, a transmission signal to a medium and receiving a reception signal reflected from the medium. A controller is configured to remove noise from a frequency range recognized as a normal signal from the reception signal and calculate a correlation between the transmission signal and a signal in the frequency range recognized as the normal signal in the reception signal. In addition, the controller is configured to determine whether the signal in the frequency range recognized as the normal signal is the normal signal or noise based on the calculated correlation.

14 Claims, 14 Drawing Sheets

(56) References Cited

U.S. PATENT DOCUMENTS

2011/0242939 A1* 10/2011 Pederson ............... G01S 15/88
                                                      367/89

FOREIGN PATENT DOCUMENTS

| JP | 2003-225238 A | 8/2003 |
|----|---------------|--------|
| JP | 2007-147540 A | 6/2007 |
| JP | 2011038993 A | 2/2011 |
| KR | 10-2002-0043588 | 6/2002 |
| KR | 10-2005-0100988 | 10/2005 |

* cited by examiner

Analysis of Waveforms and Frequencies of Reflected Transmission Signal (48KHz) and Noise (40KHz)

APPARATUS AND METHOD FOR REMOVING NOISE OF ULTRASONIC SYSTEM

CROSS-REFERENCE TO RELATED APPLICATION

This application claims under 35 U.S.C. §119(a) the benefit of Korean Patent Application No. 10-2013-0115145 filed on Sep. 27, 2013, the entire contents of which are incorporated herein by reference.

BACKGROUND (a) Technical Field

The present disclosure relates to an apparatus and method for removing noise of an ultrasonic system to improve robustness against noise by removing external noise from a reception signal reflected from an object.

(b) Background Art

Generally, a reception ultrasonic signal reflected from an object has the same characteristics as a transmission ultrasonic signal. In other words, when reflected from an object, an ultrasonic signal does not undergo change in characteristics, such as frequency or waveform length, except for signal magnitude attenuation that corresponds to a medium. A system using an ultrasonic sensor, such as a Parking Assist System (PAS) or a Smart Parking Assist System (SPAS) calculates a distance from the medium using time of arrival of a transmission signal after reflection from the medium, and uses a Band Pass Filter (BPF) for removing external noise when the signal reflected from the medium is received.

Referring to FIG. 8, a conventional ultrasonic system includes an ultrasonic sensor 10 configured to sense a reception signal (e.g., received signal) reflected from a medium, a Band Pass Filter (BPF) 30 configured to remove external noise from the received signal, an amplitude modulator (AMP) 20 configured to modulate an amplitude of the received signal from which the external noise is removed, an edge detector 40 configured to remove a high-frequency component from an output value of the AMP 20, and a controller 50 configured to calculate a distance from the medium using a time difference between input time (e.g., reception time) of the received signal and output time (e.g., transmission time) of the transmitted signal. The conventional ultrasonic system detects an envelope of a received signal when a signal transmitted through an ultrasonic sensor is reflected from a reflector. When the detected envelope is greater than a predetermined value, an object is recognized and a corresponding alarm is generated or distance information is collected to perform a PAS or a SPAS function.

However, as shown in FIG. 9, when external noise greater than a predetermined value exists within a BPF frequency range, the conventional ultrasonic system recognizes that noise (that is, the external noise greater than the predetermined value which exists within the BPF frequency range) as a normal signal and generates an incorrect alarm. Accordingly, the conventional ultrasonic system performs signal transmission and reception twice to distinguish the external noise from the received signal. In other words, to determine whether the received signal reflected from an object once is a noise, signal transmission and reception are performed once more, to distinguish the external noise from the received signal. However, due to transmission and reception time of the ultrasonic signal and twice signal processing, a system delay occurs, causing potential performance degradation of the ultrasonic system. For example, when a vehicle using the ultrasonic system moves at a rapid speed, object recognition may be delayed due to system delay and thus correct information may not be provided to a driver.

SUMMARY

Accordingly, the present invention provides an apparatus and method for removing noise of an ultrasonic system, in which noise existing in a frequency range recognized as a "normal signal" may be distinguished and removed and a transmission signal having a frequency change over time may be used to maintain correlation between the transmission signal and a reception signal despite a frequency shift phenomenon in the reception signal, to maintain robustness against a Doppler phenomenon.

According to one exemplary embodiment of the present invention, a method for removing noise of an ultrasonic system may include transmitting a transmission signal to a medium and receiving a reception signal reflected from the medium, removing noise from a frequency range recognized as a normal signal from the reception signal, calculating a correlation between the transmission signal and a signal in the frequency range recognized as the normal signal in the reception signal, and determining whether the signal in the frequency range recognized as the normal signal is the normal signal or noise based on the calculated correlation. The calculation may include calculating a correlation between the transmission signal and the signal in the frequency range recognized as the normal signal using $R(\tau) = \int_{-\infty}^{\infty} f(x)g(x+\tau)dx$, in which $f(x)$ denotes a function describing a transmission signal over time and $g(x+\tau)$ denotes a function describing a reception signal over time. The determination may include determining that the signal in the frequency range recognized as the normal signal is the normal signal, when the calculated correlation is greater than a threshold value, and determining that the signal in the frequency range recognized as the normal signal is noise, when the calculated correlation is less than a threshold value. A frequency modulation signal whose frequency changes over time may be used as the transmission signal.

According to another exemplary embodiment of the present invention, an apparatus for removing noise of an ultrasonic system may include an ultrasonic sensor configured to transmit a transmission signal to a medium and receive a reception signal reflected from the medium, a correlation detector configured to calculate a correlation between the transmission signal and a signal in a frequency range recognized as a normal signal in the reception signal, and a controller configured to compare an output value of the correlation detector with a threshold value and determine whether the signal in the frequency range recognized as the normal signal is the normal signal or noise based on the comparison result.

The apparatus may further include a Band Pass Filter (BPF) configured to remove noise from the frequency range recognized as the normal signal from the reception signal. The correlation detector may be configured to calculate a correlation between the transmission signal and the signal in the frequency range recognized as the normal signal by using $R(\tau) = \int_{-\infty}^{\infty} f(x)g(x+\tau)dx$, in which wherein $f(x)$ denotes a function describing a transmission signal over time and $g(x+\tau)$ denotes a function describing a reception signal over time. The controller may be configured to determine that the signal in the frequency range recognized as the normal signal is the normal signal, when the calculated correlation is greater than a threshold value, and determine that the signal in the frequency range recognized as the normal signal is noise, when the calculated correlation is less than a threshold value. The ultrasonic sensor may use a frequency modulation signal whose frequency changes over time as the transmission signal.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein.

DETAILED DESCRIPTION

Figure 1:
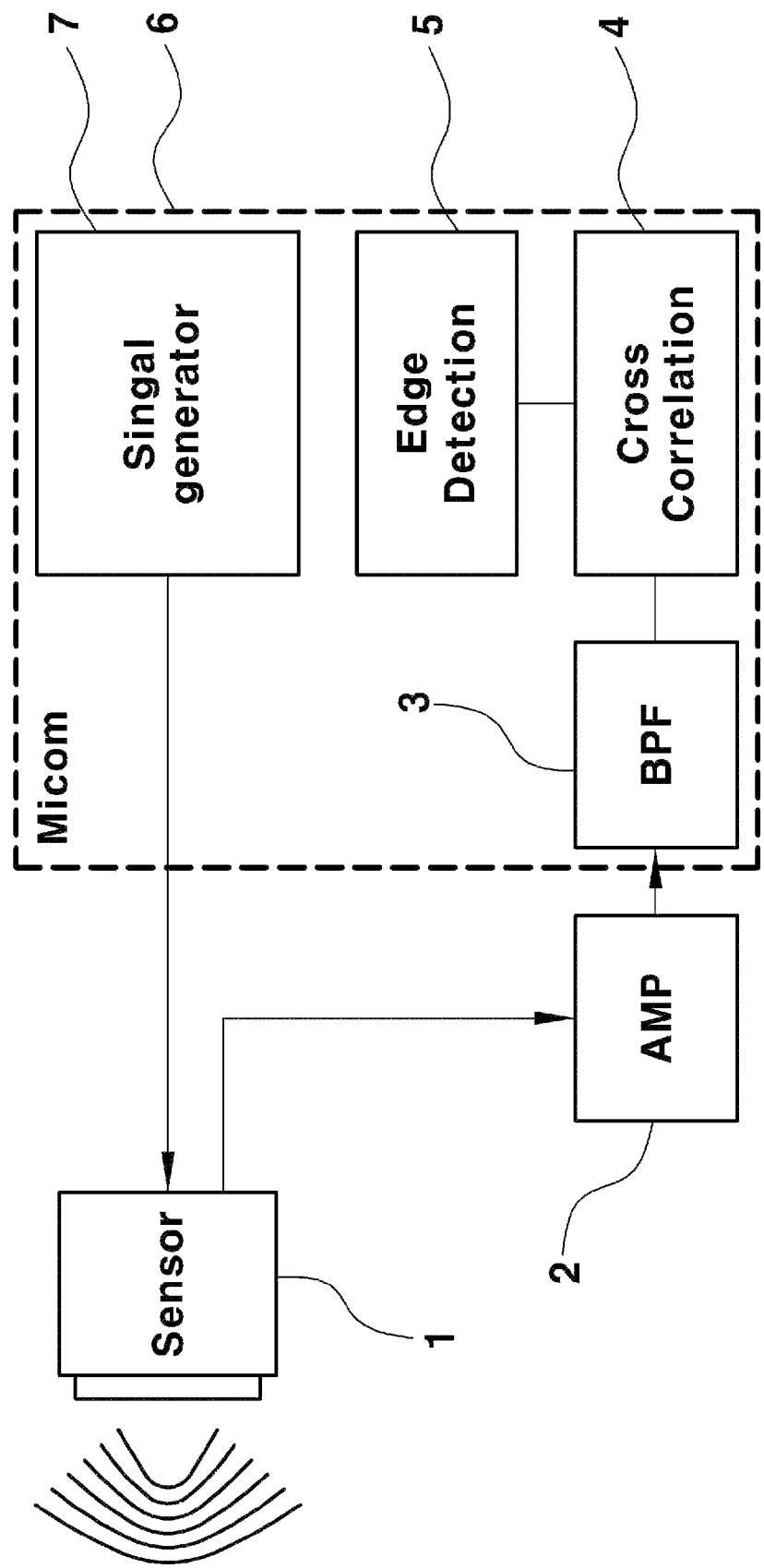
FIG. 1 is an exemplary diagram showing an ultrasonic system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described to allow those of ordinary skill in the art to easily carry out the present invention.

The present invention relates to a technique for removing noise of an ultrasonic system that may be configured to recognize an object through transmission and reception of an ultrasonic signal, in which to distinguish a normal signal from external noise in a frequency range recognized as the normal signal, robustness against external noise of the ultrasonic system may be improved using a correlation detector employing a correlation function, and during similarity detection between two signals using the correlation function, data may be distorted due to a frequency shift phenomenon caused by a Doppler phenomenon, such that a transmission signal having a frequency change is used and thus even when the frequency shift phenomenon occurs in a signal, correlation between a transmission signal and a reception signal may be maintained to secure robustness against the Doppler phenomenon.

As shown in FIG. 1, an ultrasonic system according to an exemplary embodiment of the present invention may include an ultrasonic sensor 1, a magnitude modulator AMP 2, a Band Pass Filter (BPF) 3, a correlation detector 4 that uses a correlation function, an edge detector 5, and a controller 6.

The ultrasonic sensor 1 transmits a signal generated by a signal generator 7 of the controller 6 to a medium and receives a signal reflected from the medium. The AMP 2 may be configured to modulate amplitude of a received signal suitably for a target value. The BPF 3, executed by the controller 6, may be configured to determine a signal beyond the frequency range (e.g., an ultrasonic sensing region) recognized as a normal signal, as noise and remove the signal. A normal signal may be a signal that is not a noise signal. The correlation detector 4, executed by the controller 6, may be configured to calculate similarity or correlation to distinguish noise in the frequency range recognized as a normal signal. The edge detector 5, executed by the controller 6, may be configured to remove a high-frequency component from an output value of the correlation detector 4 and output a magnitude of the output value.

The controller 6 may be configured to compare a detection result of the correlation detector 4, more accurately, an output value of the edge detector 5 with a threshold value preset by an experiment to determine whether noise is a normal signal, remove noise, calculate a distance from an object in a predetermined distance range using information regarding a transmission signal and information regarding a reception signal from which external noise is removed, and recognize the object.

As is known, a received ultrasonic signal received after being reflected from the object has about the same characteristics as a transmitted ultrasonic signal. In other words, the ultrasonic signal may have minimal change in characteristics, such as a frequency and a length of a waveform, except for attenuation of a signal magnitude caused by a medium. Thus, the transmitted signal may be received after being reflected from the object when the received signal has similarity with the transmitted signal. Therefore, in the present invention, even when the received signal exists in an ultrasonic sensing region (e.g., a range of a BPF or a BPF range), when the received signal has different characteristics than those of the transmitted signal using characteristics of a correlation function that describes similarity between two signals as a value, the received signal may be determined to be external noise.

The ultrasonic system according to an exemplary embodiment of the present invention may have information regarding a transmission signal in the controller 6, and thus may be configured to compare similarity between a transmission signal and a reception signal. To compare similarity between a transmission signal and a reception signal, a correlation function may be used. In other words, to determine whether a reception signal has substantially similar or identical characteristics to those of a transmission signal, the characteristics of the correlation function may be used. The correlation function describes a similarity between two signals over time, such that a correlation detector may be implemented which calculates correlation between the two signals over time using the correlation function. The correlation function is a function for describing correlation between two signals over time, and may be expressed as follows:

$$R(\tau) = \int_{-\infty}^{\infty} f(x)g(x+\tau)dx,$$

where f(x) denotes a function that indicates a transmission signal over time, and g(x+τ) denotes a function that indicates a reception signal over time.

The correlation detector may be configured to calculate correlation between a transmission signal and a reception signal through a correlating process between the two signals to remove noise that exists in a frequency range recognized as a normal signal. More specifically, once the correlation detector detects similarity between the transmission signal and the reception signal as a value using a correlation function, the controller may be configured to determine whether the reception signal is a normal signal or noise using a detection value (e.g., an output value) of the correlation detector, which has passed through the edge detector.

When the output value of the correlation detector, which has passed through the edge detector, is greater than a threshold value, the controller may be configured to determine that the two signals share a similarity and recognize the reception signal as a normal signal. When the output value is less than the threshold value, the controller may be configured to determine that the two signals have no similarity and recognize the reception signal as noise, thus removing noise existing in the frequency range recognized as the normal signal. Accordingly, in a process of comparing similarity between a transmission signal and a reception signal using the correlation function, data distortion may occur due to a frequency shift phenomenon caused by a Doppler phenomenon. The Doppler phenomenon refers to a phenomenon in which the frequency and wavelength of a wave change with a relative velocity between a wave source and an observation site, and may be expressed as follows:

$$f = f_0 + \frac{\Delta v}{c} f_0,$$

where f denotes a frequency of a current reception signal based on the Doppler phenomenon, $f_0$ denotes a frequency of a transmission signal, $\Delta v$ denotes a relative velocity between a wave source and an observation site, and c denotes a velocity of an ultrasonic wave. The ultrasonic wave may have a velocity of about 340 m/s in the air.

The Doppler phenomenon causes a change in frequency characteristics of a reception signal during transmission and reception of ultrasonic waves when a vehicle or a sensing target moves. In other words, the Doppler phenomenon causes frequency shift of the reception signal and thus distorts data of the reception signal. Therefore, when similarity between the transmission signal and the caption signal is reduced by the Doppler phenomenon, false recognition that determines a normal reception signal as noise may occur during a correlating process, and system performance in sensing the target may be degraded.

For reference, when a vehicle having an ultrasonic system mounted thereon moves, a velocity of the vehicle may be calculated to reflect the vehicle's velocity in the correlating process for correction, but when a counterpart object moves, this process may be more difficult to execute. Accordingly, in the present invention, to maintain system performance and distinguish a normal signal from external noise by minimizing an influence of the Doppler phenomenon, a signal whose frequency changes over time may be used as a transmission signal.

As can be known from the foregoing equation of the correlation function, the correlating process using the correlation detector may include a process of summing products of two waveforms (signals) over time. Therefore, when characteristics of two signals that undergo the correlating process are similar for a predetermined time, a correlation may increase. As mentioned before, upon occurrence of the Doppler phenomenon, a frequency component of a received signal may change and thus may be higher or lower than that of a transmission signal, and as a result, a correlation between the transmission signal and the reception signal may decrease.

Figure 2A:
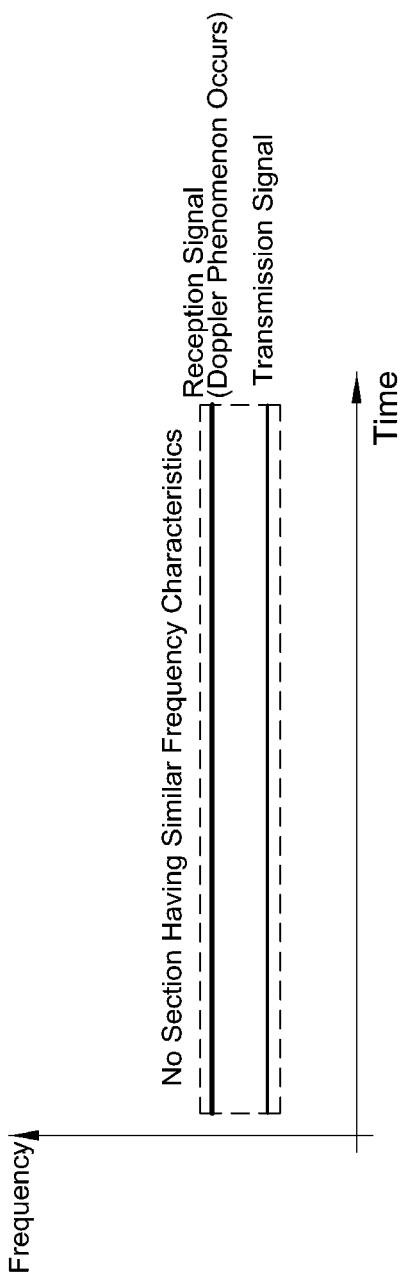
FIGS. 2A and 2B are exemplary diagrams for describing a method of maintaining robustness against a Doppler phenomenon when noise of an ultrasonic system is removed according to an exemplary embodiment of the present invention.
Figure 2B:
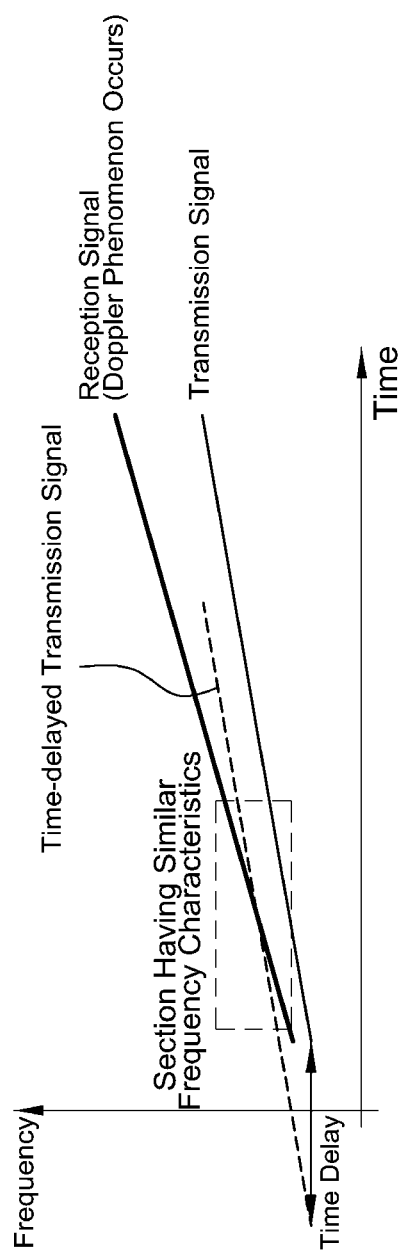

However, when the frequency of the transmission signal changes, a result as shown in FIG. 2B may be obtained. In addition, FIG. 2A shows a similarity between a transmission signal and a reception signal when a general ultrasonic signal having a sine waveform is used as the transmission signal. As shown in FIG. 2A, when the general ultrasonic signal is used as the transmission signal, upon occurrence of the Doppler phenomenon, the transmission signal and the reception signal may not have a section in which frequency characteristics are substantially similar, such that a correlation between the two signals decreases and thus recognizing a distance from an object using the system may be difficult.

Further, FIG. 2B shows a similarity between a transmission signal and a reception signal when a signal whose frequency changes over time is used as the transmission signal. As shown in FIG. 2B, when a signal whose frequency changes over time is used as the transmission signal, upon occurrence of the Doppler phenomenon, the reception signal may have a higher frequency than the transmission signal, but as mentioned before, since the correlating process is a process of summing products of two waveforms (signals) over time, a time-delayed waveform of the transmission signal shows that a similarity between time-delayed transmission signal and reception signal may be maintained and thus a greater correlation may be obtained. Therefore, using a signal whose frequency changes over time as a transmission signal, robustness against the Doppler phenomenon may be secured, and thus, despite the occurrence of the Doppler phenomenon, resulting data distortion may be minimized. The frequency change may include any form of changes, such as increase, decrease, secondary increase, secondary decrease, decrease after increase, and increase after decrease over time.

Figure 3A:
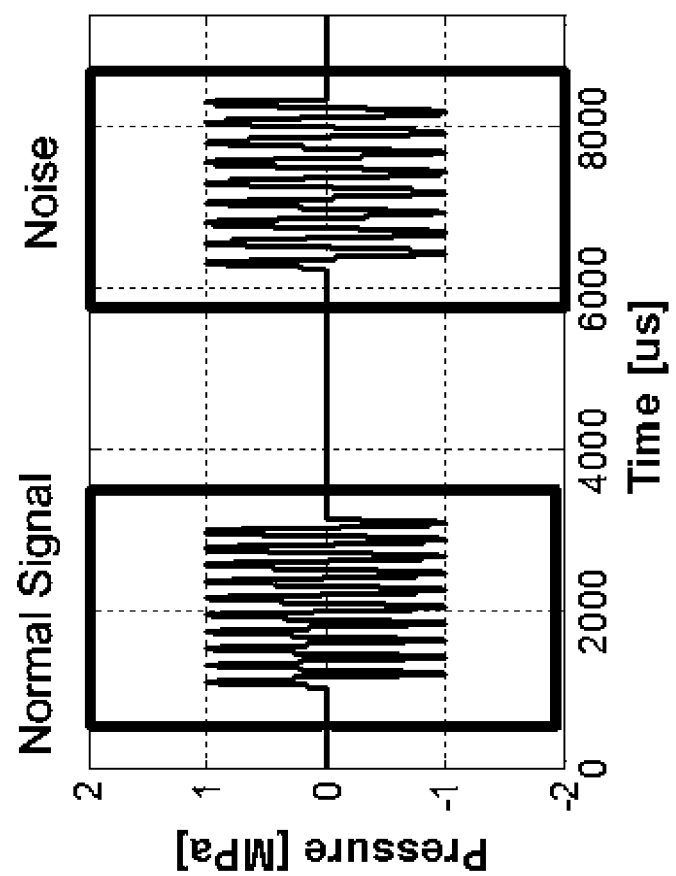
FIGS. 3A and 3B are exemplary graphs showing a waveform indicating a transmission signal of 48 KHz and noise of 40 KHz and a frequency analysis result of the waveform according to an exemplary embodiment of the present invention.
Figure 3B:
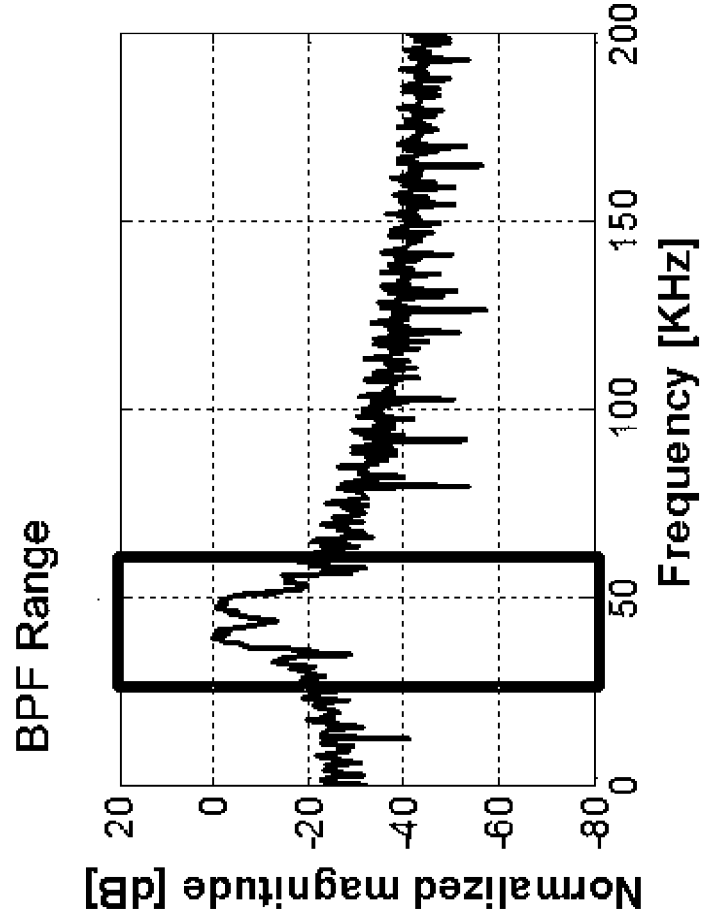

FIGS. 4A to 7B show exemplary simulation results of the ultrasonic system according to an exemplary embodiment of the present invention. FIGS. 3A and 3B are exemplary graphs showing a waveform indicating a transmission signal of 48 KHz and noise of 40 KHz and a frequency analysis result of the waveform. As seen from the frequency analysis result of FIGS. 3A and 3B, both the reception signal and noise may have frequencies in a BPF range.

Figure 4A:
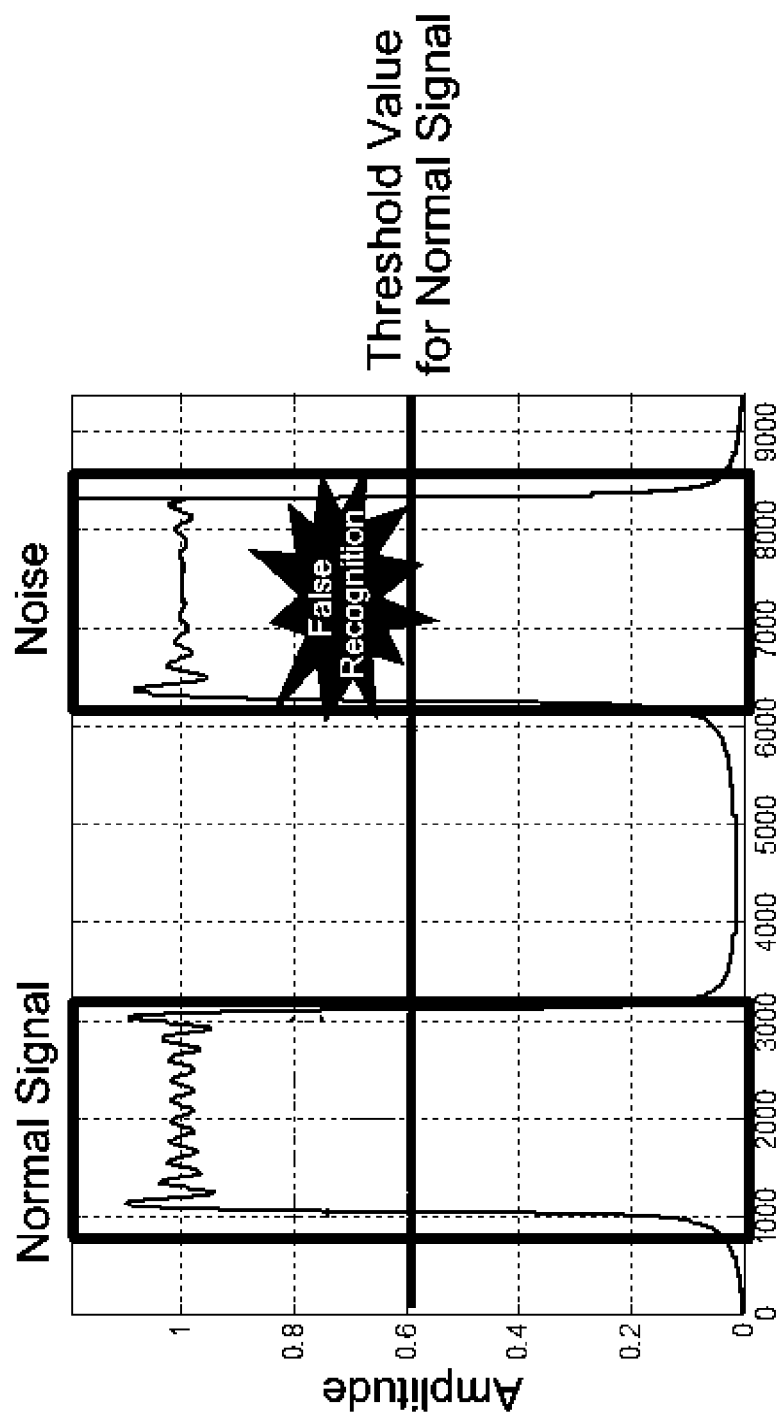
FIGS. 4A and 4B are exemplary graphs showing comparison of a noise removal effect of an ultrasonic system according to an exemplary embodiment of the present invention with that of a conventional ultrasonic system.
Figure 4B:
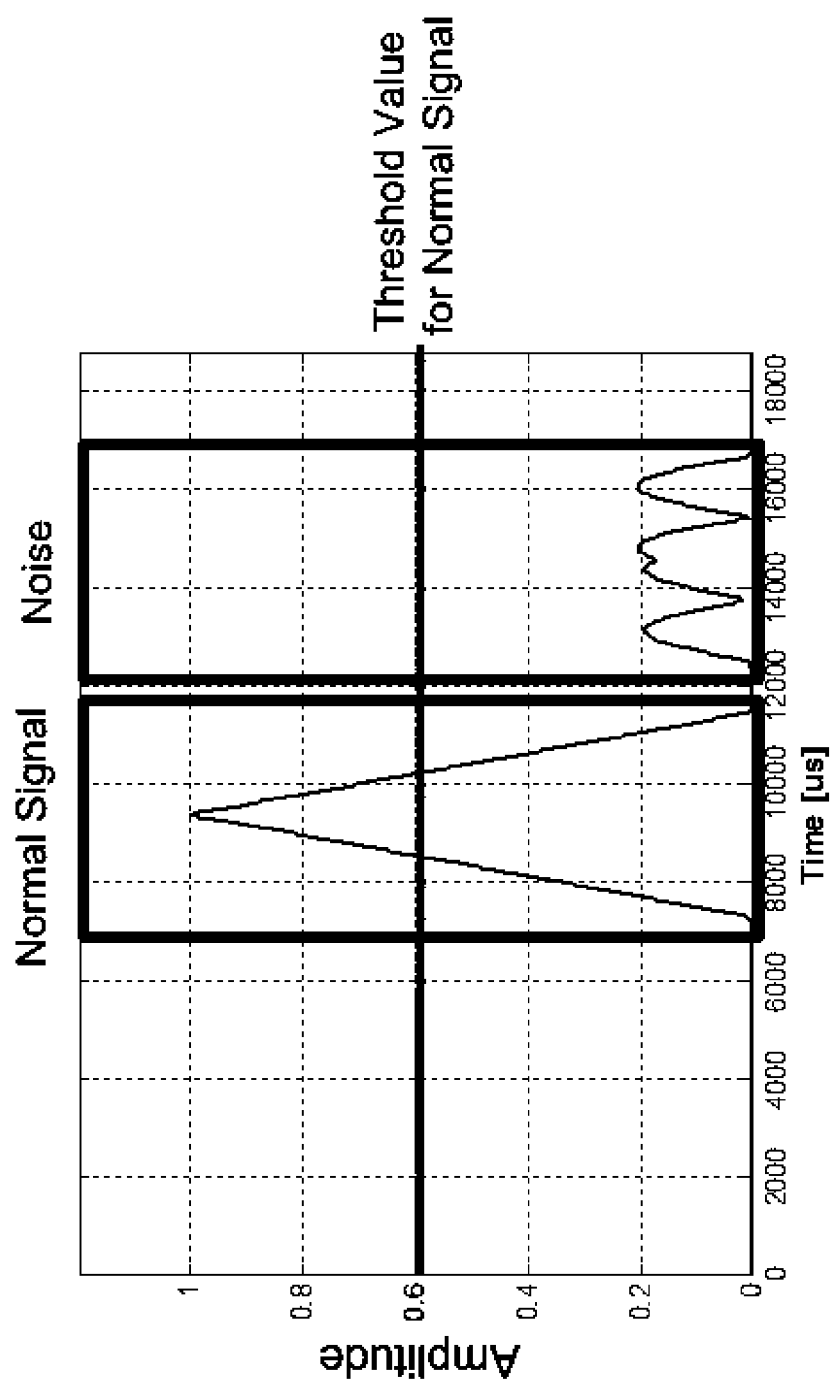

FIGS. 4A and 4B are exemplary graphs showing comparison of a noise removal effect of the ultrasonic system according to an exemplary embodiment of the present invention with that of the conventional ultrasonic system. FIG. 4A shows an exemplary result after noise of a reception signal (e.g., normal signal) shown in FIGS. 3A and 3B passes through a noise removal process in a conventional ultrasonic system, and FIG. 4B shows an exemplary result after noise of the reception signal (e.g., normal signal) passes through the noise removal process in an ultrasonic system according to an exemplary embodiment the present invention. As seen from FIG. 4A, the conventional ultrasonic system may be configured to recognize noise having frequency in a BPF range as a signal, thus erroneously recognizing noise greater than a threshold value as a normal signal. On the other hand, as seen from FIG. 4B, the ultrasonic system may use a correlation detector, such that a normal signal may have a greater value than the threshold value (e.g., for recognition of the normal signal), but noise may have a value less than the threshold value due to a decreased similarity with the transmission signal. Therefore, by setting the threshold value through simulation, the normal signal (e.g., the reception signal) and noise in the frequency range recognized as the normal signal may be effectively distinguished from each other. Herein, the conventional ultrasonic system may be configured to remove external noise merely using a BPF of about 30 KHz-75 KHz.

Figure 5A:
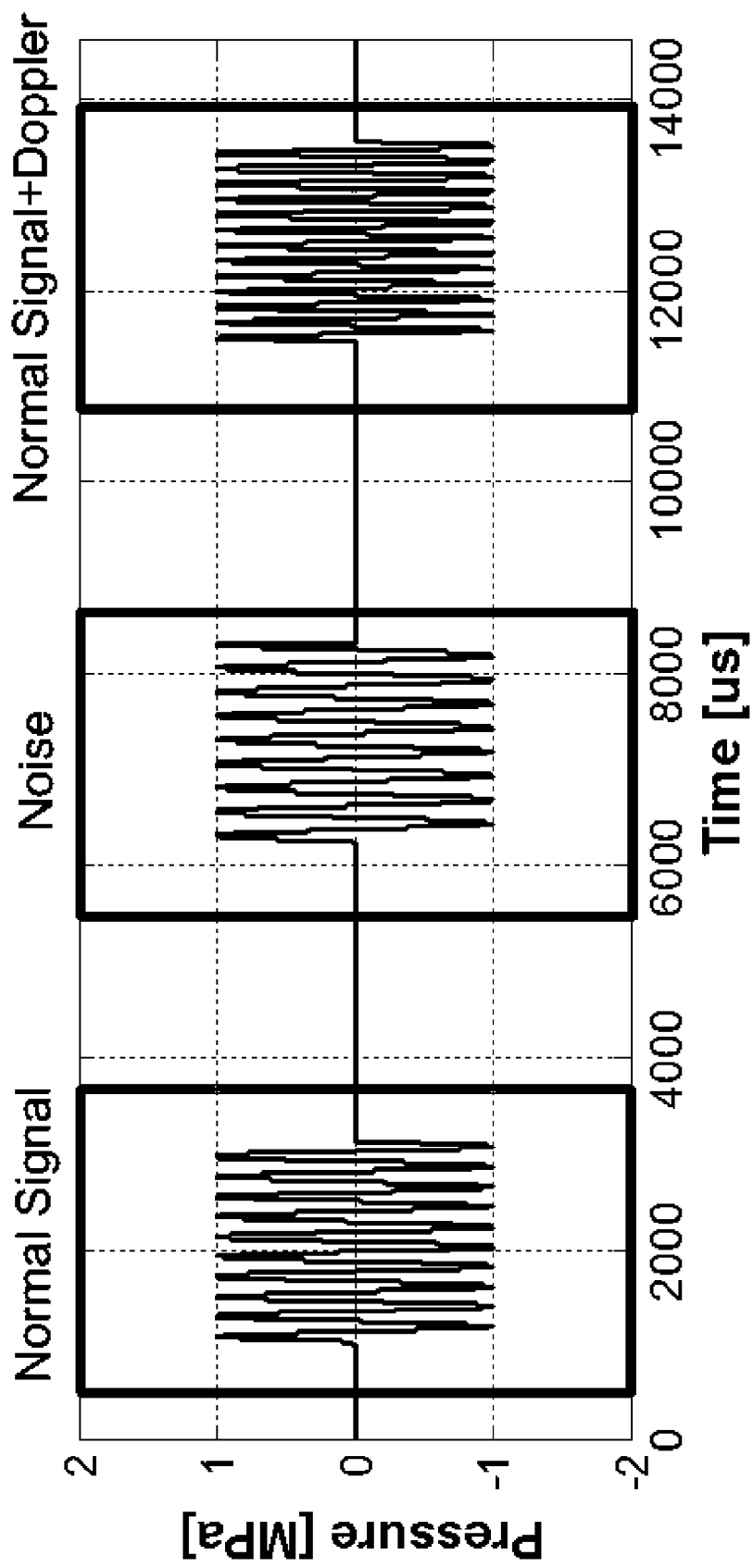
FIGS. 5A and 5B are exemplary graphs showing a waveform of a normal reception signal, a waveform of 40 KHz noise, and a waveform of a reception signal whose frequency is increased due to a Doper phenomenon according to an exemplary embodiment of the present invention.
Figure 5B:
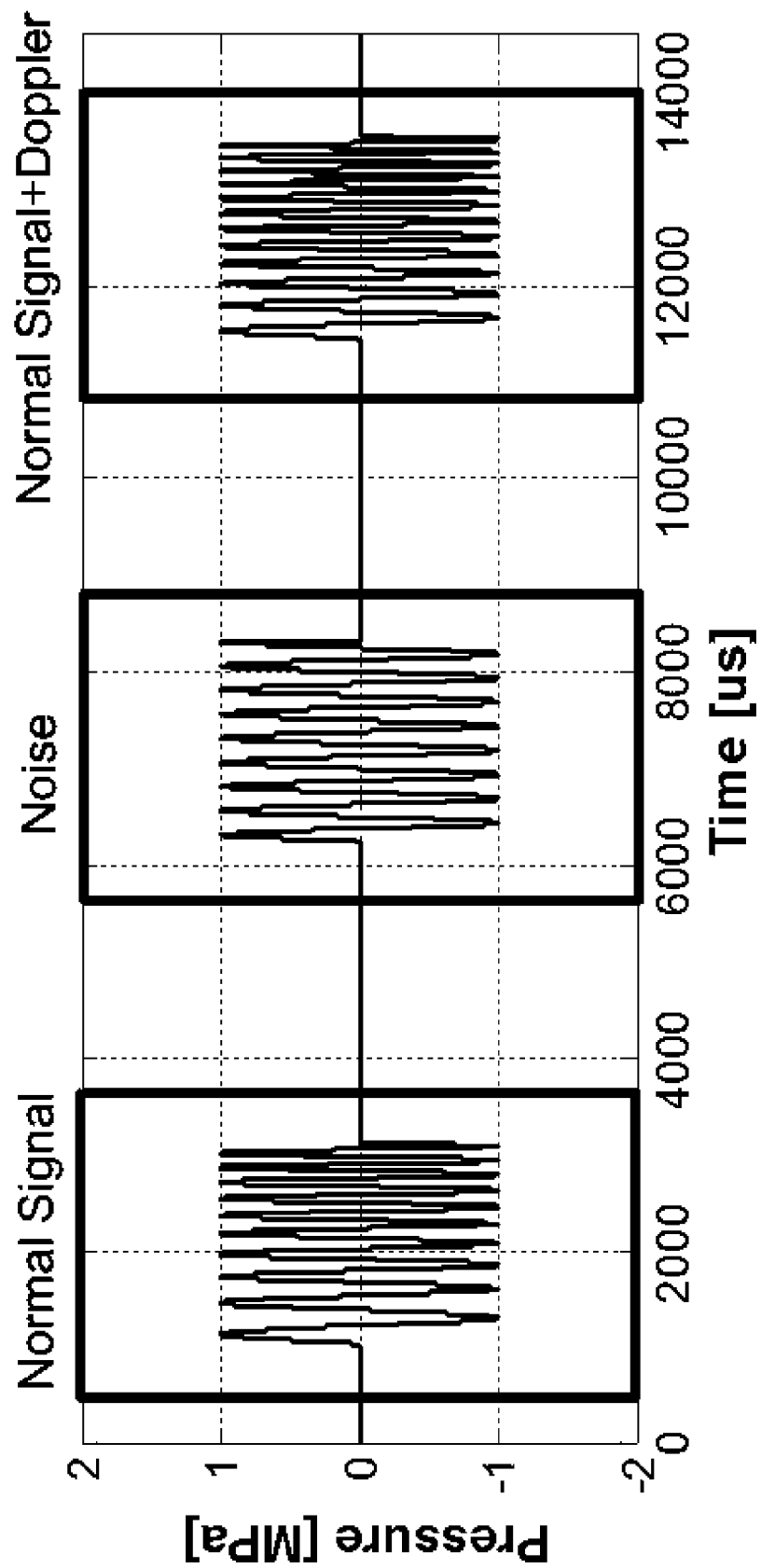
Figure 6A:
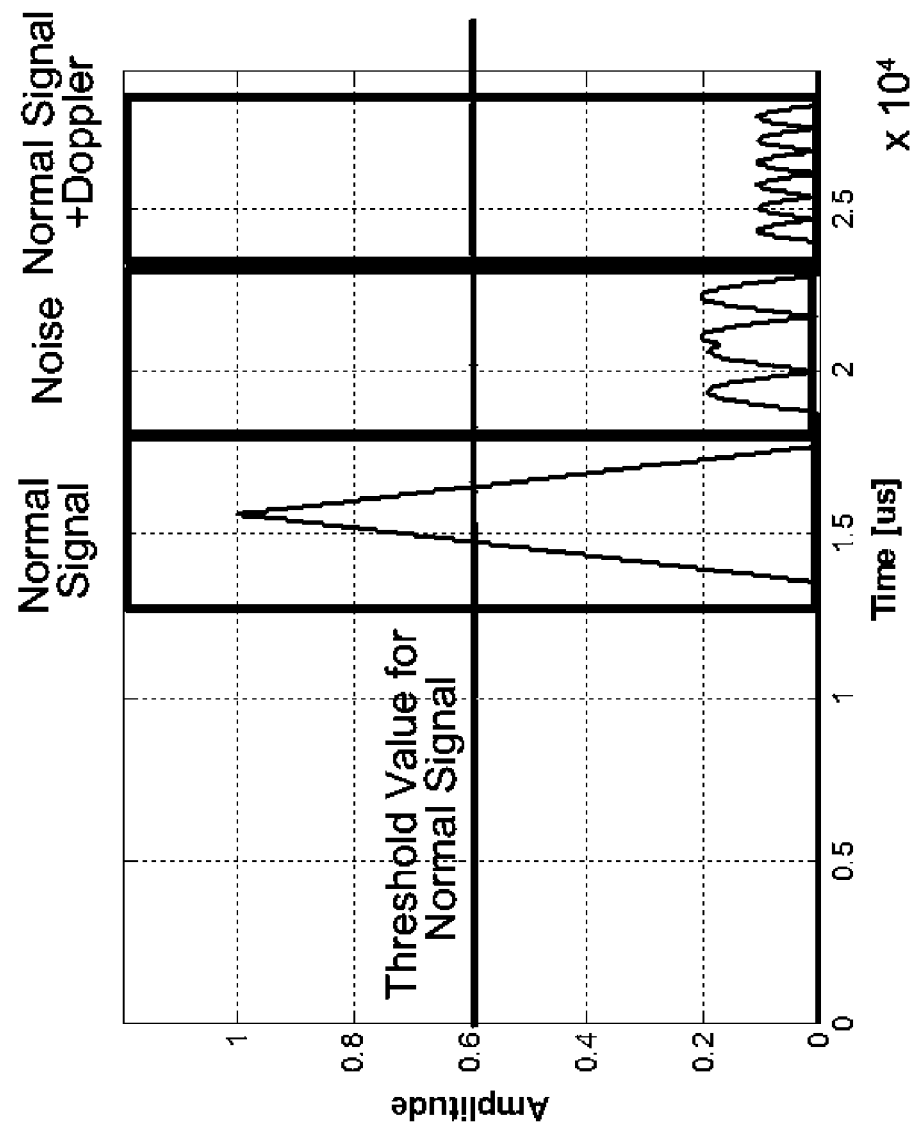
FIGS. 6A and 6B are exemplary graphs showing comparison between a simulation result of a transmission signal used in an ultrasonic system according to an exemplary embodiment of the present invention and a simulation result of a general ultrasonic signal, when a frequency of a reception signal is increased by about 20% from that of a transmission signal due to a Doppler phenomenon.
Figure 6B:
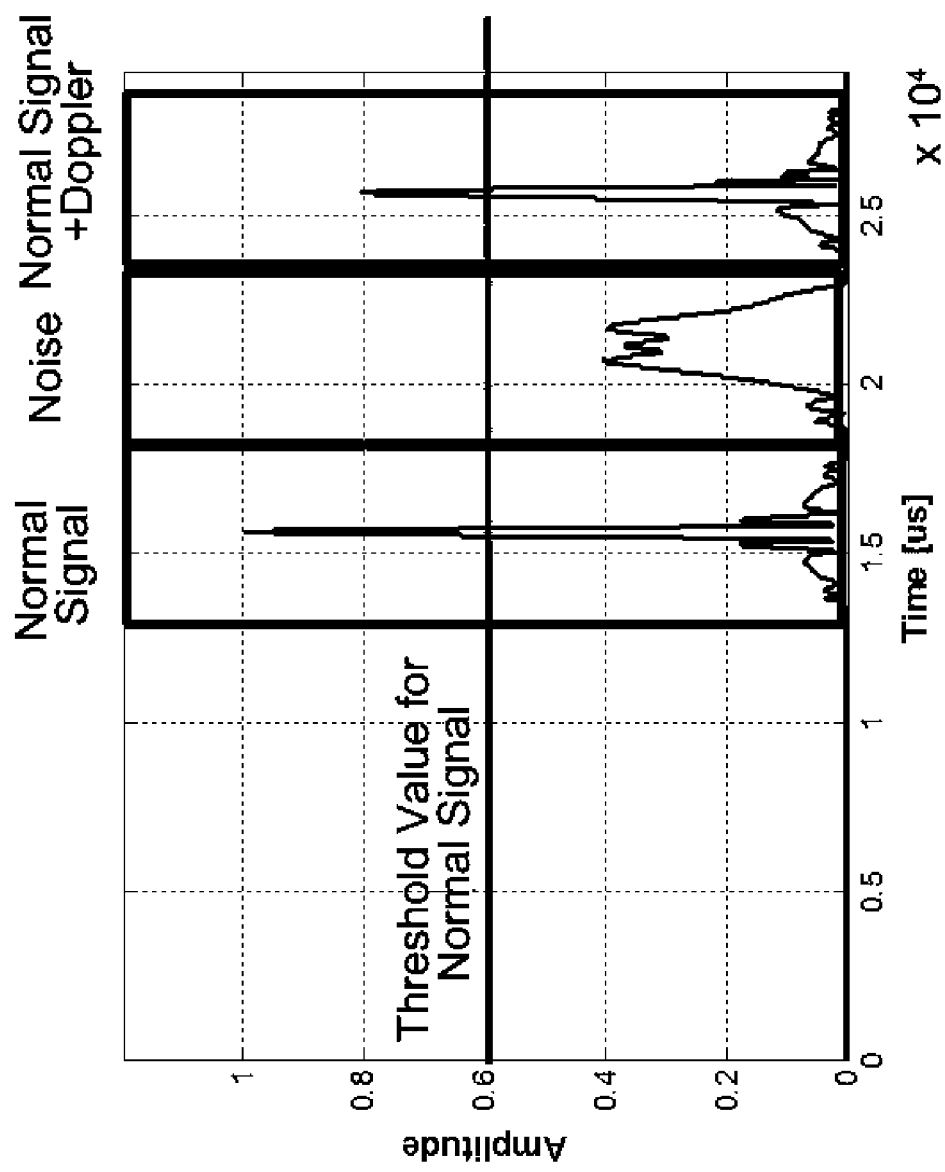

FIGS. 5A and 5B sequentially show waveforms of a normal reception signal, 40 KHz noise, and reception signal whose frequency is increased due to the Doppler phenomenon from left to right. FIGS. 6A and 6B are exemplary graphs showing a comparison between a simulation result of a transmission signal (e.g., frequency modulation signal) used in the ultrasonic system of the present invention and a simulation result of a general ultrasonic signal, when a frequency of a reception signal is increased by about 20% from that of the transmission signal due to the Doppler phenomenon.

FIG. 6A shows an exemplary simulation result when a general signal of 48 KHz is transmitted, and FIG. 6B shows an exemplary simulation result when a frequency modulation signal (e.g., signal whose frequency changes over time) of about 33 KHz-63 KHz is transmitted. In other words, FIGS. 6A and 6B are exemplary waveforms showing processing results of a normal reception signal (e.g., normal signal), about 40 KHz noise, and a reception signal whose frequency is increased by the Doppler phenomenon by the correlation detector. FIG. 6A shows exemplary processing results of the correlation detector when a general signal is used, and FIG. 6B shows exemplary processing results of the correlation detector when a frequency modulation signal (e.g., signal whose frequency changes over time) of about 33 KHz-63 KHz is used.

As shown in FIG. 6A, when the general signal is used, noise (e.g., about 40 KHz) in a BPF range (e.g., about 30 KHz-75 KHz) may be suppressed by filtering using the correlation function and simultaneously, a correlation of a reception signal to which the Doppler phenomenon is applied with the transmission signal may also be reduced, and thus may fail to be recognized as a normal signal and may be suppressed by filtering using the correlation function. On the other hand, as seen in FIG. 6B, when a signal whose frequency changes over time is transmitted and received, a reception signal to which the Doppler phenomenon is applied may have an increased correlation with a transmission signal and thus may have an increased amplitude value that exceeds the threshold value for recognition as a normal signal. Therefore, by setting a threshold value for recognition as a normal signal, a normal signal (e.g., reception signal) and noise in a frequency range recognized as a normal signal may be distinguished, thus improving system performance.

Moreover, foregoing simulation may assume that a frequency may be increased by about 20% with respect to a conventional transmission frequency due to the Doppler phenomenon and a relative velocity applied to the Doppler phenomenon may be about 380 km/h, in which it may be seen that in an actual environment using ultrasonic waves (e.g., at a relative velocity of about 20 km/h or less), an influence of the Doppler phenomenon may be very weak. Therefore, the ultrasonic system according to an exemplary embodiment of the present invention, which may use a frequency modulation signal, may improve reliability in an actual environment.

A problem that may occur in signal processing is introduction of noise from a sensor or electronic equipment. The noise may be white noise and may have an average of 0 and a finite variance. The correlation detector used in the ultrasonic system may be configured to filter noise using the correlation function, in which a process of summing products of the two signals over time may be repeated to cancel information regarding white noise, such that signal processing of the system may not be affected much.

Figure 7A:
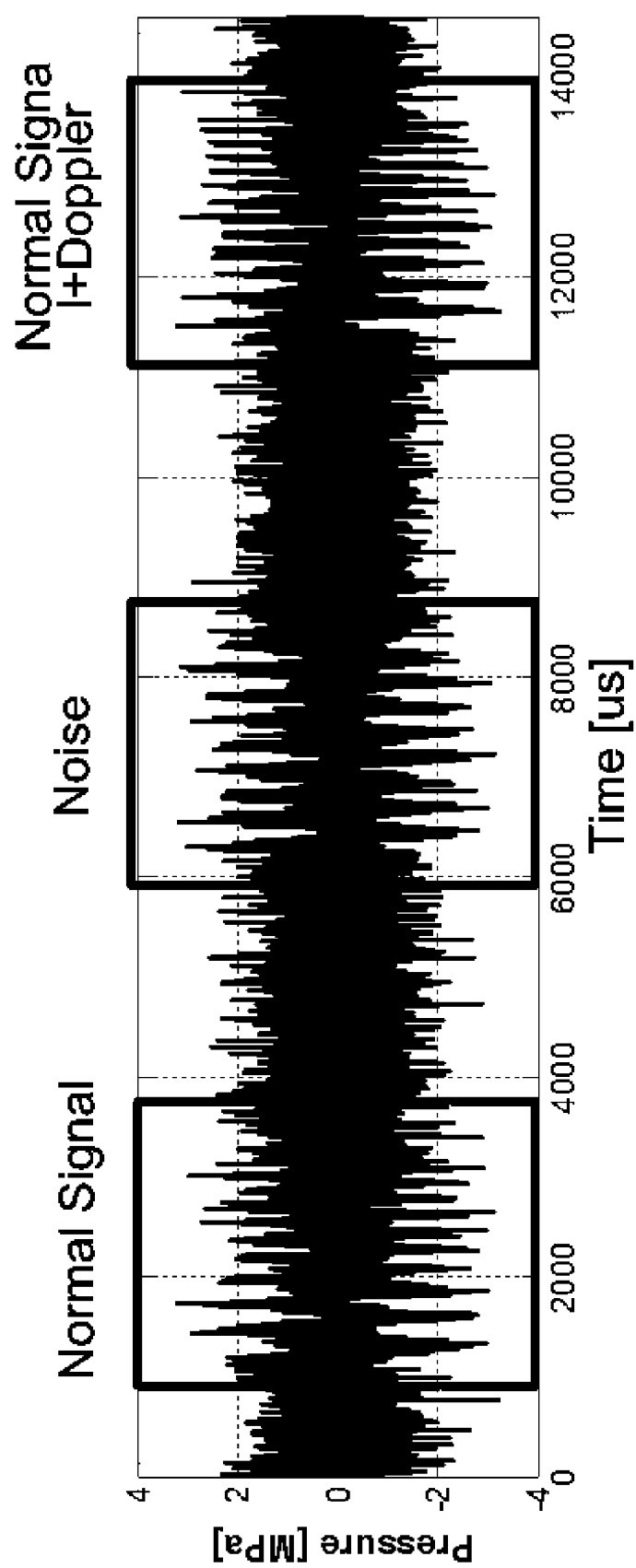
FIGS. 7A and 7B show exemplary waveforms of a normal reception signal, 40 KHz noise, and a reception signal whose frequency is increased by about 20% due to a Doper phenomenon in a white noise environment and waveforms after processing using a correlation detector according to an exemplary embodiment of the present invention.
Figure 7B:
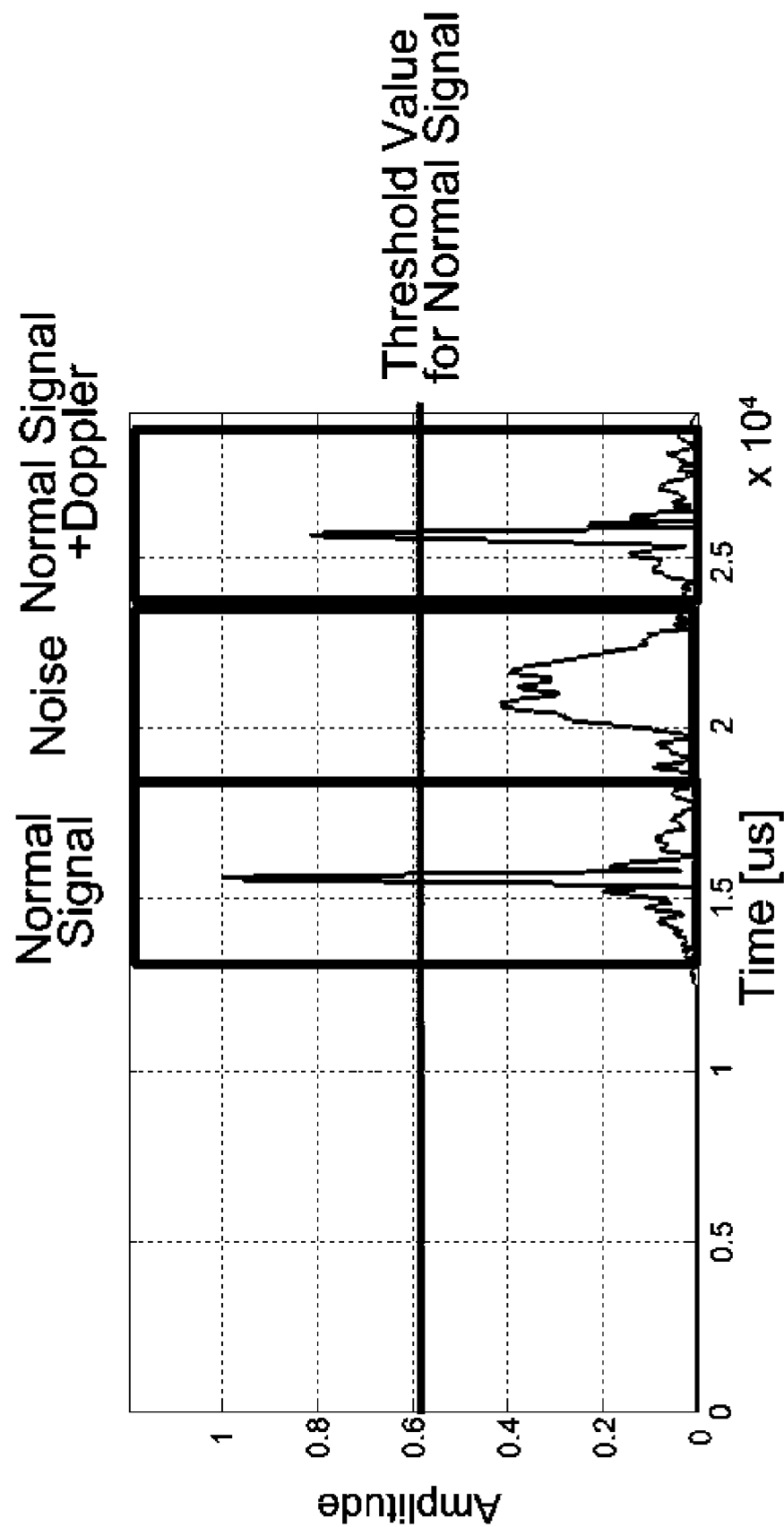
Figure 8:
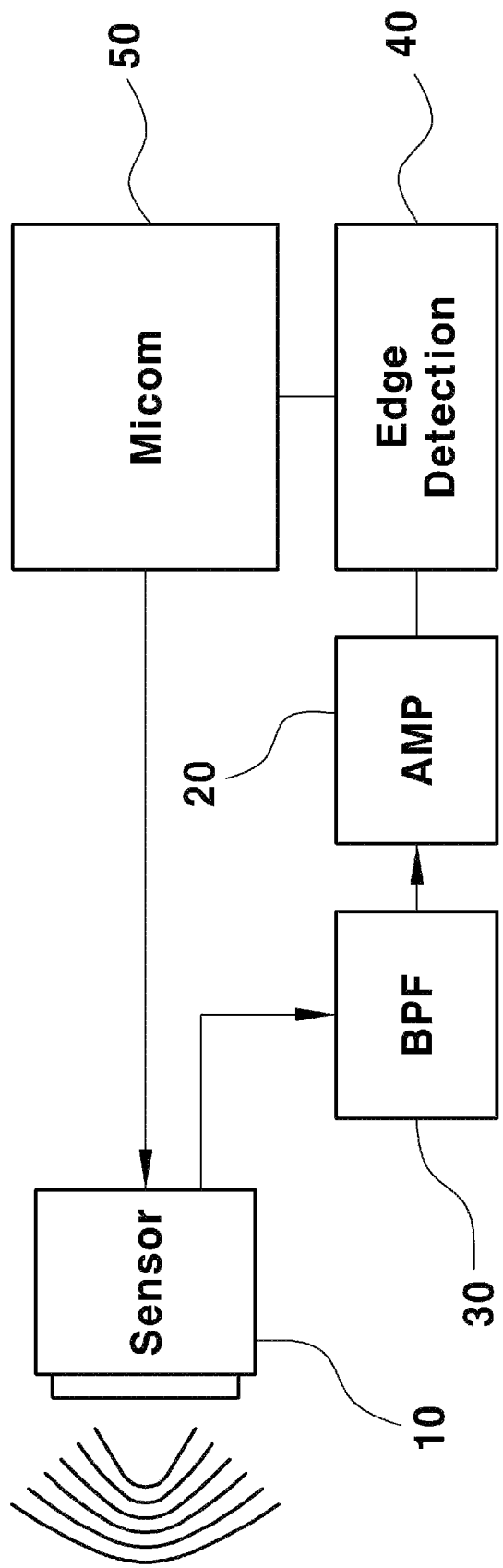
FIG. 8 is a diagram showing a conventional ultrasonic system according to the related art.
Figure 9:
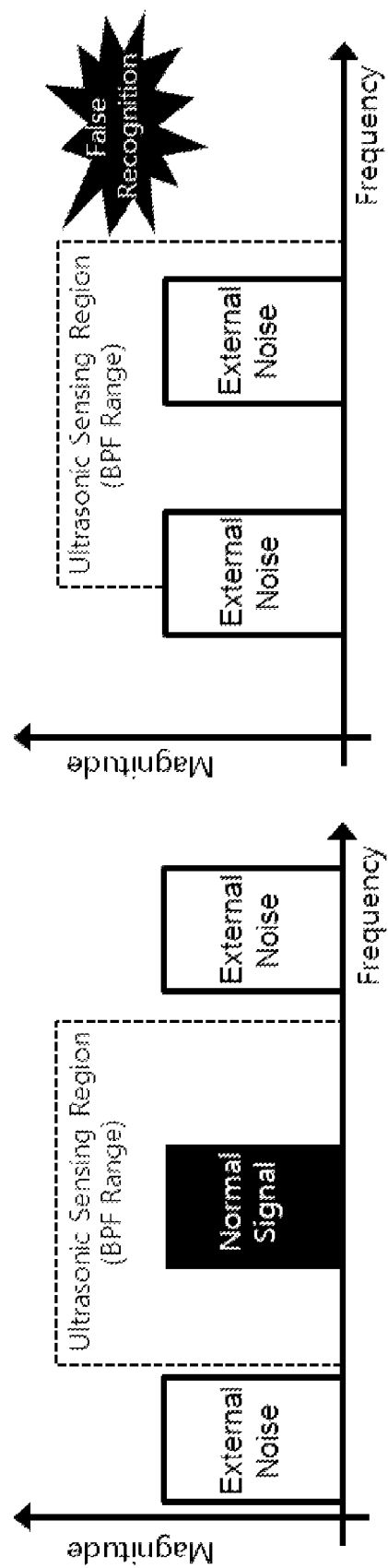
FIG. 9 is an exemplary diagram for describing a problem of a conventional ultrasonic system according to the related art.

FIG. 7A show exemplary waveforms of a normal reception signal, about 40 KHz noise, and a reception signal whose frequency is increased by about 20% due to the Doper phenomenon in a white noise environment (e.g., having a Signal to Noise Ratio (SNR)=2) and exemplary waveforms after processing using the correlation detector. As shown in FIGS. 7A and 7B, even in the white noise environment, noise may be suppressed to be less than the threshold value, to be distinguished from a normal signal, and a normal signal to which the Doppler phenomenon exceeds a threshold value and thus may be recognized as a normal reception signal. Thus, the ultrasonic system according to the present invention may maintain robustness against sensor noise.

According to the present invention, using a noise filter using a correlation function, robustness against external noise may be reinforced to minimize an influence of external noise and improve robustness with respect to the Doppler phenomenon, thus improving system performance. Moreover, the ultrasonic system according to the present invention may distinguish and remove external noise through one-time transmission and reception, to improve system performance compared to the conventional ultrasonic system, that is, the conventional ultrasonic system that performs transmission and reception twice to distinguish external noise and a reception signal.

While the embodiment of the present invention have been described in detail, the scope of the present invention is not limited to the foregoing exemplary embodiment and various modifications and improves made by those of ordinary skill in the art using the basic concept of the present invention defined in the appended claims are also included in the scope of the present invention.

DESCRIPTION OF REFERENCE NUMERALS

| | |
|---|---|
| 1: Ultrasonic Sensor | 2: Amplitude Modulator |
| 3: Band Pass Filter | 4: Cross Correlation Detector |
| 5: Edge Detector | 6: Controller |
| 7: Signal Generator | |

What is claimed is:

1. A method for removing noise of an ultrasonic system, the method comprising:
    transmitting, by a sensor, a transmission signal to a medium and receiving a reception signal reflected from the medium;
    removing, by a controller, noise of the ultrasonic system beyond a frequency range recognized as a normal signal from the reception signal;
    calculating, by the controller, a correlation between the transmission signal and a signal in the frequency range recognized as the normal signal in the reception signal; and
    determining, by the controller, whether the signal in the frequency range recognized as the normal signal is the normal signal or noise based on the calculated correlation,
    wherein the calculating of the correlation includes:
        calculating, by the controller, the correlation between the transmission signal and the signal in the frequency range recognized as the normal signal using:

$R(\tau)=\int_{-\infty}^{\infty}f(x)g(x+\tau)dx$, wherein f(x) denotes a function describing the transmission signal, and g(x+τ) denotes a function describing the reception signal over time, and
   wherein a frequency of the transmission signal changes over time, and a frequency of the reception signal is increased over time by the Doppler phenomenon by a correlation detector.

2. The method of claim 1, wherein the determination includes determining, by the controller, that the signal in the frequency range recognized as the normal signal is the normal signal, when the calculated correlation is greater than a threshold value.

3. The method of claim 1, wherein the determination includes determining, by the controller, that the signal in the frequency range recognized as the normal signal is noise, when the calculated correlation is less than a threshold value.

4. The method of claim 1, wherein a frequency modulation signal whose frequency changes over time is used as the transmission signal.

5. The method of claim 1, wherein the frequency change over time includes any one of an increase in frequency, a decrease in frequency, a secondary increase in frequency, a secondary decrease in frequency, a decrease in frequency after the increase in frequency, and an increase in frequency after the decrease in frequency.

6. An apparatus for removing noise of an ultrasonic system, the apparatus comprising:
    an ultrasonic sensor configured to transmit a transmission signal to a medium and receive a reception signal reflected from the medium; and
    a controller configured to:
        calculate a correlation between the transmission signal and a signal in a frequency range recognized as a normal signal in the reception signal;
        compare an output value of a correlation detector with a threshold value; and
        determine whether the signal in the frequency range recognized as the normal signal is the normal signal or noise based on the comparison result,
    wherein the calculation of the correlation includes:
        calculating the correlation between the transmission signal and the signal in the frequency range recognized as the normal signal using:

$R(\tau)=\int_{-\infty}^{\infty}f(x)g(x+\tau)dx$, wherein f(x) denotes a function describing the transmission signal, and g(x+τ) denotes a function describing the reception signal over time, and
   wherein a frequency of the transmission signal changes over time, and a frequency of the reception signal is increased over time by the Doppler phenomenon by the correlation detector.

7. The apparatus of claim 6, further comprising a Band Pass Filter (BPF), executed by the controller to remove noise from the frequency range recognized as the normal signal from the reception signal.

8. The apparatus of claim 6, wherein the controller is configured to determine that the signal in the frequency range recognized as the normal signal is the normal signal, when the calculated correlation is greater than a threshold value.

9. The apparatus of claim 6, wherein the controller is configured to determine that the signal in the frequency range recognized as the normal signal is noise, when the calculated correlation is less than a threshold value.

10. The apparatus of claim 6, wherein the ultrasonic sensor uses a frequency modulation signal whose frequency changes over time as the transmission signal.

11. A non-transitory computer readable medium containing program instructions executed by a controller, the computer readable medium comprising:
program instructions that control a sensor to transmit a transmission signal to a medium and receiving a reception signal reflected from the medium;
program instructions that remove noise of a ultrasonic system beyond a frequency range recognized as a normal signal from the reception signal;
program instructions that calculate a correlation between the transmission signal and a signal in the frequency range recognized as the normal signal in the reception signal; and
program instructions that determine whether the signal in the frequency range recognized as the normal signal is the normal signal or noise based on the calculated correlation,
wherein the calculation of the correlation includes:
calculating the correlation between the transmission signal and the signal in the frequency range recognized as the normal signal using:

$$R(\tau) = \int_{-\infty}^{\infty} f(x) g(x+\tau) dx,$$

wherein f(x) denotes a function describing the transmission signal, and g(x+τ) denotes a function describing the reception signal over time, and
wherein a frequency of the transmission signal changes over time, and a frequency of the reception signal is increased over time by the Doppler phenomenon by the correlation detector.

12. The non-transitory computer readable medium of claim 11, further comprising:
program instructions that determine that the signal in the frequency range recognized as the normal signal is the normal signal, when the calculated correlation is greater than a threshold value.

13. The non-transitory computer readable medium of claim 11, further comprising:
program instructions that determine that the signal in the frequency range recognized as the normal signal is noise, when the calculated correlation is less than a threshold value.

14. The non-transitory computer readable medium of claim 11, wherein a frequency modulation signal whose frequency changes over time is used as the transmission signal.

* * * * *